United States Patent [19]
Goloff

[11] 4,083,292
[45] Apr. 11, 1978

[54] PISTON WITH HIGH TOP RING LOCATION

[75] Inventor: Alexander Goloff, East Peoria, Ill.

[73] Assignee: Caterpillar Tractor Co., Peoria, Ill.

[21] Appl. No.: 697,079

[22] Filed: Jun. 16, 1976

[51] Int. Cl.² ............................................. F01P 3/10
[52] U.S. Cl. ...................................... 92/176; 92/182; 92/186; 92/220
[58] Field of Search ................. 92/176, 186, 213, 220, 92/216, 182, 221, 159; 123/41.35, 193 P; 277/189.5

[56] References Cited

U.S. PATENT DOCUMENTS

| | | | |
|---|---|---|---|
| 1,089,823 | 3/1914 | Day et al. | 92/220 X |
| 1,376,705 | 5/1921 | Kottusch | 92/213 |
| 1,764,465 | 6/1930 | Nute | 92/159 |
| 1,800,077 | 4/1931 | Jennings | 92/159 |
| 2,159,402 | 5/1939 | Retschy | 92/220 |
| 2,387,344 | 10/1945 | Paton | 92/186 X |
| 2,619,392 | 11/1952 | Brown | 92/220 X |
| 2,720,193 | 10/1955 | Maybach | 123/41.36 |
| 2,759,461 | 8/1956 | Maybach et al. | 123/41.35 |
| 2,806,750 | 9/1957 | Gehres | 92/186 |
| 3,465,651 | 9/1969 | Tromel | 92/186 |
| 3,834,719 | 9/1974 | Shin et al. | 92/182 |
| 3,877,351 | 4/1975 | Barfiss | 92/186 X |
| 3,882,841 | 5/1975 | Silverstein | 92/176 X |

FOREIGN PATENT DOCUMENTS

| | | | |
|---|---|---|---|
| 816,319 | 4/1937 | France | 92/220 |
| 896,923 | 5/1944 | France | 92/220 |
| 733,931 | 4/1943 | Germany | 92/220 |
| 718,612 | 11/1954 | United Kingdom | 92/186 |

Primary Examiner—Irwin C. Cohen
Attorney, Agent, or Firm—Wegner, Stellman, McCord, Wiles & Wood

[57] ABSTRACT

An improved piston assembly comprising a generally cylindrical body having at one end a peripheral shoulder and at the other end a depending skirt, an annular ring groove protection band formed of hard metal and having a peripheral, radially outwardly opening ring receiving groove seated on the shoulder, and a crown secured to the body one end and having a radially outwardly extending flange engaging the band about its periphery and clamping the band against the shoulder. Insulating means are interposed between the crown and the band.

4 Claims, 3 Drawing Figures

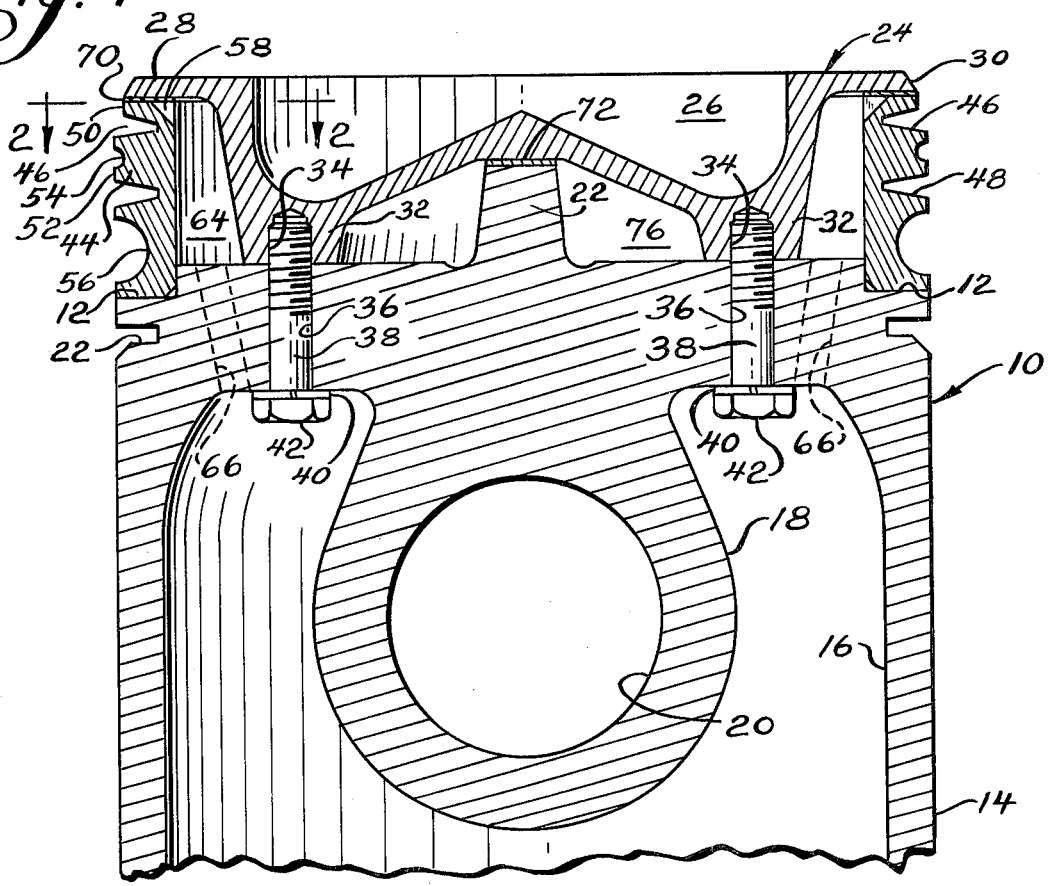
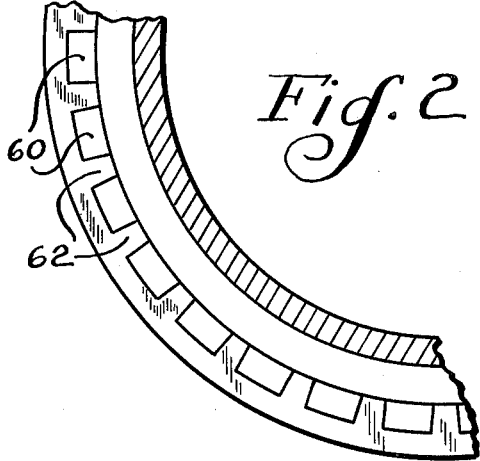
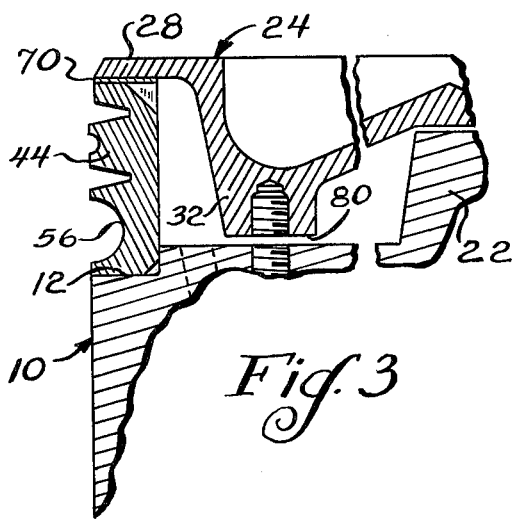

4,083,292

PISTON WITH HIGH TOP RING LOCATION

BACKGROUND OF THE INVENTION

This invention relates to improved piston assemblies.

Prior art of possible relevance includes the following U.S. Pat. Nos.: 2,214,891 issued Sept. 17, 1940 to Schrom; 2,720,193 issued Oct. 11, 1955 to Maybach; 3,215,130 issued Nov. 2, 1965 to Maier; 3,323,503 issued June 6, 1967 to Grosshans et al; 3,463,057 issued Aug. 26, 1969 to Packard et al; 3,465,651 issued Sept. 9, 1969 to Tromel; 3,508,531 issued Apr. 28, 1970 to Squinto et al; and 3,738,231 issued June 12, 1973 to Zurner.

Over the years, many efforts have been made to provide a good piston assembly wherein the top compression ring is at a very high location immediately adjacent the crown. Such a location of the top compression ring minimizes the parasitic volume of a reciprocating mechanism in which such a piston is used, thereby improving performance. A high location also maximizes control over oil consumption and minimizes emissions of a noxious character.

Heretofore, notwithstanding the foregoing known advantages of such pistons, high top ring pistons have not been employed to the extent possible for any of a variety of reasons. In many designs, the top ring cannot be placed sufficiently high on the piston to minimize parasitic volume to the extent desired. Frequently, ring location has been lowered since it has been impossible to provide effective cooling of the top ring, which cooling is necessary to maintain a good lubricating oil film to prevent the shortening of the life of the ring.

In some cases, pistons with high top ring locations have not been satisfactory in that the groove receiving the ring is inadequately protected and is therefore prone to abnormal wear, shortening its life.

In other instances, the designs have been such that highly desirable, so-called "cocktail shaker cooling" for either or both the crown of the piston and a ring groove protection band has been impossible.

SUMMARY OF THE INVENTION

It is the principal object of the invention to provide a new and improved piston assembly with a high top ring location. More specifically, it is an object of the invention to provide such a piston assembly wherein the groove for the top ring is immediately adjacent the crown to minimize parasitic volume in a reciprocating mechanism in which the piston may be employed, provides for effective cooling of the top ring to prolong its life, provides for protection of the groove receiving the ring and which can employ cocktail shaker cooling for either or both the piston crown and the ring groove protection band.

An exemplary embodiment of the invention achieves the foregoing object in a piston assembly construction including a generally cylindrical piston body having at one end a peripheral shoulder and at the other end, a depending skirt. An annular ring groove protection band formed of hard metal and having a peripheral, radially outwardly opening ring-receiving groove is seated on the shoulder. A crown is secured to the body and has a radially outwardly extending flange engaging the band about its periphery to clamp the band against the shoulder.

In a highly preferred embodiment, the surface of the band adjacent the flange of the crown is provided with a relief and the band, crown and body define a coolant receiving cavity into which the relief opens. Thus, coolant received in the cavity is directed to the upper edge of the band to provide good cooling for a ring received in the groove.

In a highly preferred embodiment, the relief is defined by a plurality of cutouts separated by gussets.

Sealing means may be interposed between the flange and the crown, which sealing means may be in the form of a gasket or in the form of a metallurgical bond. It is preferred that the sealing means be an insulator to preclude substantial flow of heat from the crown to the band thereby allowing the band to operate at a cooler temperature so that the ring received in the groove thereon will run at a relatively cool temperature.

In a highly preferred embodiment, the flange is relatively thin and the groove is spaced from the flange by a narrow land and at least the flange is chamfered, thereby providing a good flow path for gases under pressure to "gas energize" the ring.

In one embodiment, the thermal conductivity of the band is greater than that of the crown to further assist in cooling the band, and thus a ring received in the groove therein.

The invention also contemplates that the body be formed of a light-weight metal and that the band be provided with one or more additional peripheral grooves which are unsuitable for receipt of a ring. The additional groove reduces the mass of the band, thus allowing the fabrication of a light-weight piston assembly.

In a highly preferred embodiment, the crown is secured to the body by a threaded fastener and includes a surface remote from the crown periphery abutting the body. The abutting surface and the flange are constructed such that the flange will engage the band but the surface will be slightly spaced from the body prior to securement of the crown to the body by the threaded fastener and will be brought into engagement with the body upon tightening of the threaded fastener causing the crown to be stressed to store clamping energy to be applied to the band so that the same will not move during operation of a mechanism including the piston assembly.

Other objects and advantages will become apparent from the following specification taken in connection with the accompanying drawings.

DESCRIPTION OF THE DRAWINGS

FIG. 1 is a sectional view of a piston assembly made according to the invention with the lower portion of the skirt deleted;

FIG. 2 is a fragmentary sectional view taken approximately along the line 2—2 of FIG. 1; and FIG. 3 is a fragmentary sectional view of the piston assembly prior to the securement of the components together.

DESCRIPTION OF THE PREFERRED EMBODIMENTS

An exemplary embodiment of a piston assembly made according to the invention is illustrated in FIG. 1 and is seen to include a generally cylindrical piston body, generally designated 10, preferably formed of a light-weight material such as aluminum, magnesium, or alloys thereof. The body 10 includes an upwardly facing shoulder 12 and a depending skirt 14, the latter defining a cavity 16 for receipt of a piston rod and a wrist pin.

Depending lugs 18 are provided with bores 20 for receipt of such a wrist pin.

Just below the shoulder 12, the body 10 is provided with a radially outwardly opening groove 22 for receipt of an oil ring (not shown). The upper center of the body 10 is provided with an upwardly directed post 22 which abuts the center of the underside of a crown, generally designated 24. The crown 24 is formed of a metal, preferably of a relatively low thermal conductivity, and includes a crater 26 shaped according to conventional techniques to optimize combustion when the assembly is employed in a reciprocating engine.

The upper end of the crown 24 is provided with a radially outwardly extending flange 28 which is relatively thin and includes a chamfer 30 at its outermost edge. The underside of the crown 24 is provided with an annular shoulder 32 having four downwardly opening threaded bores 34 (only two of which are shown).

The upper portion of the body 10 is provided with bores 36 alignable with the bores 34 for receipt of threaded fasteners 38 which extend into the bores 34 to clamp the crown 26 to the body. Where the body 10 is formed of a relatively soft metal, it is preferable that washers 40 be interposed between the heads 42 of the fastener and the body 10.

An annular, ring groove protection band 44 formed of a hard metal, such as cast iron or steel and having a relatively high thermal conductivity as compared to the crown 24, is located on the shoulder 12 and is clamped in position by the flange 28. In the illustrated embodiment, the band 44 is provided with upper and lower radially outwardly opening piston compression ring receiving grooves 46 and 48 respectively.

The upper groove 46 is spaced from the flange 28 by a relatively narrow land 50, thereby insuring that the top ring, which would be received in the groove 46, is at a very high location. It will be observed that the land 50 is of reduced diameter so as to allow relatively easy access of gases under pressure to the groove 46 for gas energization of the rings received therein. If desired, to further enhance fluid flow, the land 50 could be chamfered much like the chamfer 30.

A land 52 intermediate the grooves 46 and 48 is provided with an additional groove 54 and the lowermost portion of the band 44 includes a further additional groove 56. Both the grooves 54 and 56 are not intended for the receipt of rings and are configured as to be unsuitable for the purpose. They are provided to reduce the mass of the band 44 so that the overall assembly will be relatively light-weight, the advantages of light-weight piston assemblies being well known.

Adjacent the inner diameter of the band 44 and at the upper surface thereof in substantial abutment with the flange 28, a relief 58 is provided. As best seen in FIG. 2, the relief 58 is defined by a series of cutouts 60 separated by interposed gussets 62. The relief 58 opens into a cavity 64 defined by the inner diameter of the band 44, portions of the crown 24, as illustrated, and the upper surface of the body 10. Bores 66 extend from the cavity 64 to the cavity 16 and are adapted to convey oil, as a coolant, from a nozzle or the like (not shown) to the cavity 64. Those skilled in the art will recognize that oil in the cavity 64 will provide the so-called "cocktail shaker cooling" effect. By reason of the cutouts 60, such cooling oil will also be directed against a part of the upper surface of the band 44 above the groove 46 to provide excellent cooling of the band 44 in the vicinity of the groove 46 and thus cool the compression ring received in the groove 46. It will also be appreciated that the cutouts 60 minimize the area of contact between the crown 24 and the band 44, thereby minimizing the area through which heat transfer can occur.

In general, a sealing means 70 will be interposed between the flange 28 and the upper surface of the band 44. Such a sealing means may be in the form of a metallurgical bond formed as by welding or brazing, or any other bonding techniques which can connect two elements of dissimilar material. Alternately, the sealing means may be a gasket or some other form of seal, preferably, with a low thermal conductivity to minimize heat transfer from the crown 24 to the band 44.

It will be appreciated that the various steps identified previously to prevent heat transfer from the crown 24 to the band 44 enable the relatively high location of the groove 46. By reason of such steps, as mentioned previously, the ring received therein can be adequately cooled so that a good oil film can be maintained to prolong the life of the ring.

Returning to the post 22, the same abuts the underside of the crown 26 to support the same against the pressures encountered during operation of a mechanism in which the piston assemblies may be employed. Where a relatively low rate of heat rejection from the crown to the body is desired, a layer 72 of insulation may be interposed between the top of the post 22 and the bottom of the crown 24.

It will also be noted that the post 22 and the crown 26 define a cavity 76. Where low heat rejection is desired, the cavity 76 may serve as an insulating means in the form of a dead air space. Conversely, where it is desired that some cooling of the crown 24 be provided, conduits (not shown) from the cavity 76 to either the cavity 64 or to the cavity 16 may be provided so that lubricating oil, employed as a coolant, can achieve access to the cavity 76 and provide cooling.

In order to eliminate creep between the various parts, it is desired that some means be provided to store energy, which energy is directed against the band 44 to hold the same firmly in place on the shoulder 12. To this end, the crown 24 is stressed to store such clamping energy.

As can be seen in FIG. 3, with the band 44 firmly located in place against the shoulder 12 and the flange 28 embracing the upper side of the band 44 (albeit through sealing means 70), the crown 24 is configured such that the underside 80 of the bosses 32 is spaced a slight distance from the upper surface of the body 10 before the fasteners 38 are applied. It will also be appreciated that the underside of the crown 24 which abuts the upper surface of the post 22 is spaced a slight distance from the post, although such distance will be less than the spacing between the underside 80 of the boss and the upper surface of the body 10.

In assembling the piston, the threaded fasteners 38 are tightened to draw the underside 80 of the bosses 34 into abutment with the body 10. For the embodiment illustrated in FIG. 3, initially, contact will occur between the post 22 and the underside of the crown 24 and subsequently, contact will occur between the underside 80 of the shoulder 32 and the body 10. As a consequence, the crown will be stressed at locations inwardly of its outer diameter and will apply a good clamping force against the band 44. If desired, the components could be configured such that the crown would bottom out against the post 22, then bottom out against the band 44, and finally, bottom out against the top of the body 10, rather than as shown in FIG. 3, and the same results will be achieved.

Preferably, four cap screws are employed as the fasteners 38 although, in some instances, lesser or greater numbers can be employed. It is also to be understood that if desired, through bolts could be employed in lieu of the cap screws.

From the foregoing, it will be appreciated that a piston assembly made according to the invention provides a high top ring location wherein the top ring is adequately cooled in a construction that can be advantageously employed as a lightweight piston assembly and wherein ring grooves are adequately protected by a hard band. It will also be appreciated that through the unique configuration of the components, that highly adequate clamping forces can be applied to the band 44 to firmly hold the same in place through a variety of operating conditions thereby eliminating any need for casting the band in place, which casting involves complicated metallurgical procedures and sophisticated inspection techniques. Thus, a piston assembly made according to the invention has high performance characteristics and may be economically fabricated.

What is claimed is:

1. An improved piston assembly comprising:
a generally cylindrical piston body having a depending skirt;
a metal crown secured to said body oppositely of said skirt;
an annular metal ring groove protection band interposed between said crown and said body and clamped therebetween, said band including a first surface in substantial abutment with said crown and an adjacent second, radially outer surface;
a radially outwardly opening, ring-receiving groove in said second surface adjacent said first surface;
said band, crown and body defining a coolant receiving cavity; and
a relief in said first surface at the radially inner extremity thereof and opening to said cavity for receipt of coolant to cool said groove and a ring received therein, said relief being defined by a plurality of circumferentially spaced cutouts separated by gussets, said gussets having surfaces forming part of said first surface and in substantial abutment with said crown.

2. An improved piston assembly comprising:
a generally cylindrical piston body having a depending skirt;
a metal crown secured to said body oppositely of said skirt;
an annular metal ring groove protection band interposed between said crown and said body and clamped therebetween, said band including a first surface in substantial abutment with said crown and an adjacent second, radially outer surface;
a radially outwardly opening, ring-receiving groove in said second surface adjacent said first surface;
said band, crown and body defining a coolant receiving cavity;
a relief in said first surface at the radially inner extremity thereof and opening to said cavity for receipt of coolant to cool said groove and a ring received therein, said relief being defined by a plurality of circumferentially spaced cutouts separated by gussets, said gussets having surfaces forming part of said first surface and in substantial abutment with said crown; and
an insulator of low thermal activity interposed between said crown and at least one of said band and said body.

3. An improved piston assembly comprising:
a generally cylindrical piston body having a depending skirt;
a metal crown secured to said body oppositely of said skirt;
an annular metal ring groove protection band interposed between said crown and said body and clamped therebetween, said band including a first surface in substantial abutment with said crown and an adjacent second, radially outer surface;
a radially outwardly opening, ring-receiving groove in said second surface adjacent said first surface;
said band, crown and body defining a coolant receiving cavity; and
a relief in said first surface at the radially inner extremity thereof and opening to said cavity for receipt of coolant to cool said groove and a ring received therein, said relief being defined by a plurality of circumferentially spaced cutouts separated by gussets, said gussets having surfaces forming part of said first surface and in substantial abutment with said crown;
said band being formed of hard metal and provided with at least one additional peripheral groove, unsuitable for receipt of a ring to reduce the mass of said band, said body being formed of a lightweight metal thereby providing a light-weight piston assembly.

4. An improved piston assembly comprising:
a generally cylindrical piston body having a depending skirt;
a metal crown secured to said body oppositely of said skirt;
an annular metal ring groove protection band interposed between said crown and said body and clamped therebetween, said band including a first surface in substantial abutment with said crown and an adjacent second, radially outer surface;
a radially outwardly opening, ring-receiving groove in said second surface adjacent said first surface;
said band, crown and body defining a coolant receiving cavity; and
a relief in said first surface at the radially inner extremity thereof and opening to said cavity for receipt of coolant to cool said groove and a ring received therein, said relief being defined by a plurality of circumferentially spaced cutouts separated by gussets, said gussets having surfaces forming part of said first surface and in substantial abutment with said crown;
said crown having a radially outwardly extending flange, said flange being relatively thin, and said groove being spaced from said flange by a narrow land having a diameter less than the diameter of said band.

* * * * *